(12) United States Patent
Müller

(10) Patent No.: US 11,573,427 B2
(45) Date of Patent: Feb. 7, 2023

(54) METHOD OF ADJUSTING AN IMAGE MASK

(71) Applicant: XION GMBH, Berlin (DE)

(72) Inventor: Holger Müller, Glienicke-Nordbahn (DE)

(73) Assignee: XION GMBH, Berlin (DE)

( * ) Notice: Subject to any disclaimer, the term of this patent is extended or adjusted under 35 U.S.C. 154(b) by 72 days.

(21) Appl. No.: 17/196,512

(22) Filed: Mar. 9, 2021

(65) Prior Publication Data

US 2021/0286187 A1 Sep. 16, 2021

(30) Foreign Application Priority Data

Mar. 10, 2020 (DE) .......................... 102020106535.3

(51) Int. Cl.
*G02B 27/14* (2006.01)
*G02B 25/00* (2006.01)
*G02B 21/36* (2006.01)

(52) U.S. Cl.
CPC ............ *G02B 27/14* (2013.01); *G02B 21/361* (2013.01); *G02B 25/001* (2013.01)

(58) Field of Classification Search
CPC ..... G02B 27/14; G02B 21/361; G02B 25/001
USPC .................................................. 359/629, 643
See application file for complete search history.

(56) References Cited

U.S. PATENT DOCUMENTS

2012/0007839 A1   1/2012   Tsao et al.

FOREIGN PATENT DOCUMENTS

| DE | 10101184 | 8/2001 |
|----|----------|--------|
| DE | 102014109095 | 12/2015 |

OTHER PUBLICATIONS

Official Action with machine translation for German Patent Application No. 102020106535.3, dated Oct. 26, 2020, 8 pages.

*Primary Examiner* — William Choi
(74) *Attorney, Agent, or Firm* — Sheridan Ross P.C.

(57) ABSTRACT

The invention relates to an optical viewing system and a method of aligning an eyepiece image and an image of a camera that is part of an optical viewing system, which enables both the observation of an optical image with one eye and the capturing of the optical image with the camera. The optical viewing system comprises an optical device, an eyepiece with field diaphragm, a beam splitter, and a camera with image capturing level.

According to the method, an image mask is adjusted to the eyepiece image for the camera image of the camera as follows:

The eyepiece is illuminated from its side facing away from the optical device, and light passes through the eyepiece to the beam splitter so that the light is partially reflected from the first semi-reflective surface to the second semi-reflective surface and from the second semi-reflective surface to the camera, resulting in the camera capturing an image of the field diaphragm of the eyepiece as a light spot on the image capturing level.

The position of the center point of the light spot on the image capturing level is determined.

The image mask is aligned based on the position of the center point of the light spot on the image capturing level.

7 Claims, 11 Drawing Sheets

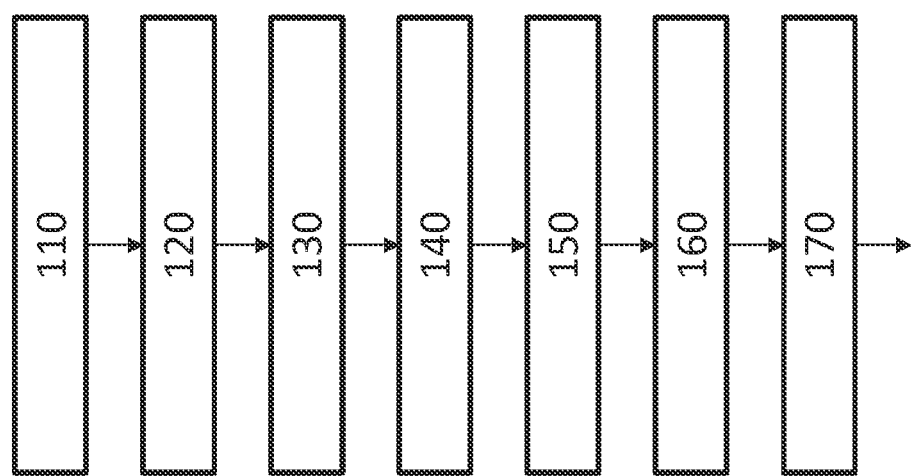

METHOD OF ADJUSTING AN IMAGE MASK

CROSS-REFERENCE TO RELATED APPLICATION

This application claims the benefit of German Patent Application No. 102020106535.3 filed 10 Mar. 2020, the entire contents of which are incorporated herein by reference.

FIELD

The invention relates to a method of aligning an eyepiece image and a camera image of a camera that is part of an optical viewing system, which allows both a visual observation of an optical image with one eye and the capturing of the optical image with the camera. The optical observation is performed through the eyepiece, while part of the light is reflected to the camera by a beam splitter so as to also capture camera images—e. g. still images or videos—during a visual observation with the eye. The optical viewing system is, for example, a microscope, an endoscope, a telescope, or the like. The invention also relates to a camera system.

BACKGROUND

Optical devices designed for visual observation, such as microscopes, endoscopes, camera viewfinders and binoculars, are often used in combination with a camera with beam splitter, thereby enabling simultaneous visual and video observation. For this purpose, the camera image should preferably be set up such that the visual eyepiece image and the video image of the camera are compatible. Due to mechanical tolerances and the magnification on the camera and eyepieces, the camera image and the eyepiece image are usually not mechanically aligned with each other in a sufficiently centric manner, and the exact size of the field of view of the eyepiece is not always known. A respective adjustment is complex and requires experience in the adjustment of optical devices.

SUMMARY

It is the object of the invention to create a simple method of compatibly aligning the visual eyepiece image and the video image of the camera.

To this end, the invention proposes a method of aligning an eyepiece image and a camera image of a camera that is part of an optical viewing system, which allows both a visual observation of an optical image with one eye and the capturing of the optical image with the camera. The optical viewing system is, for example, a microscope, an endoscope, a telescope, or the like.

The optical viewing system comprises:
  an optical device, like a microscope, a telescope, or the like;
  an eyepiece for direct visual viewing of an optical image with one eye, with the eyepiece featuring a field diaphragm;
  a beam splitter; and
  the camera that has an image capturing level.

The beam splitter, the eyepiece and the camera are configured in such a way that an optical image provided by the optical device can be simultaneously viewed through the eyepiece with one eye and recorded with the camera. The beam splitter features two semi-reflective surfaces; the first semi-reflective surface extends along a plane whose surface normal runs at a 45° angle to a main axis of the camera, and the second semi-reflective surface extends along a plane whose surface normal runs at a 90° angle to the main axis of the camera.

According to the method, an image mask for the camera image of the camera is adjusted to the eyepiece image as follows:
  The eyepiece is illuminated from its side facing away from the optical device, and light passes through the eyepiece to the beam splitter so that the light is partially reflected from the first semi-reflective surface to the second semi-reflective surface and from the second semi-reflective surface to the camera, resulting in the camera capturing an image of the field diaphragm of the eyepiece as a light spot on the image capturing level;
  the position of the center point of the light spot on the image capturing level is determined; and
  the image mask is aligned based on the position of the center point of the light spot on the image capturing level.

The invention also proposes a camera system that implements the method according to the invention.

The method according to the invention is fast, protected against incorrect operation, and can be performed fully automatically at the push of a button when it is implemented in the camera system. It does not require any specially trained personnel. Good accuracy is achieved because the method comprises the geometrical measurement of the camera lens and the field diaphragm.

The invention includes the idea to divert the eye piece from its intended use for the adjustment and to operate it like a lens. This means that the beam path through the eyepiece is used inversely, i. e. in reverse. The beam splitter is also diverted from its intended use so as to direct a back reflection of the field diaphragm of the eyepiece to the image capturing level of the camera for the adjustment.

The light input to the optical device—to a microscope, for example—used for the observation of an object is closed or diminished, and instead the eyepiece is illuminated, e. g. by the existing lighting in the room. It is also possible to provide an optical diffuser between the eyepieces and the light source for the adjustment. The back reflection of the field diaphragm of the eyepiece is captured as a camera image. The position of the light spot constituting the image of the field diaphragm in the camera image can be captured with image recognition. Preferably, the center point and the diameter of the light spot, i. e. of the image of the field diaphragm, are recorded. An image processing device connected to or integrated into the camera system can then electronically adjust the image to be displayed on a monitor or display based on the image mask, image position and image size.

The method is particularly suitable for implementation in a camera system for stereoscopic surgical microscopes. In the case of a stereoscopic optical device, two image masks are adjusted.

The invention also proposes an optical viewing system featuring an optical device with eyepiece, a beam splitter, a camera, and an image processing device. The beam splitter, eyepiece and camera are arranged such that an optical image provided by the optical device can be simultaneously observed through the eyepiece and captured by the camera. The beam splitter features at least two semi-reflective surfaces, of which a first semi-reflective surface extends along a plane whose surface normal runs at a 45° angle to a main axis of the camera, and the second semi-reflective surface extends along a plane whose surface normal runs at a 90° angle to the main axis of the camera.

The image processing device is configured to:
recognize an image of the field diaphragm of the eyepiece, captured by an image sensor of the camera, as a light spot on the image capturing level;
determine the position of the center point of the light spot on the image capturing level; and
determine a center point for an image mask based on the position of the center point of the light spot on the image capturing level.

The image processing device is preferably also configured to:
determine a radius or diameter of the light spot on the image capturing level, and
determine a radius or diameter for the image mask based on the radius or diameter of the center point of the light spot on the image capturing level.

It is further preferred that the image processing device is configured to mask and scale a part of the image, defined by the image mask on the image sensor, based on the position and size of the image mask, and to generate a corresponding output image signal for a monitor or display.

BRIEF DESCRIPTION OF THE DRAWINGS

The invention will now be explained in more detail for an exemplary embodiment and referencing the figures. These show the following:

FIG. 11: illustrates the method according to the invention in the form of a flow diagram.

DETAILED DESCRIPTION

Figure 1:
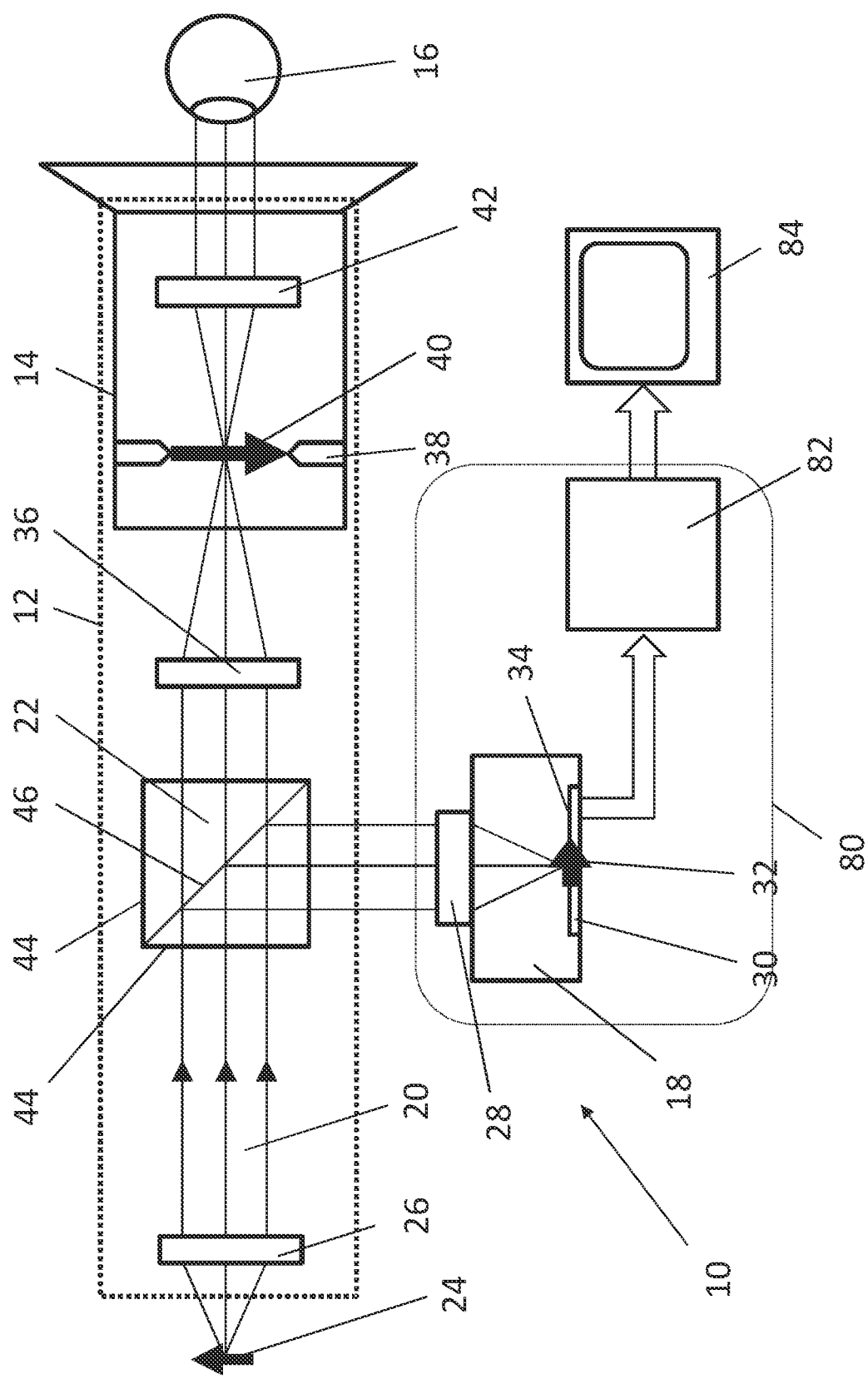
FIG. 1: shows the beam path of a microscope with so-called infinity optics.

FIG. 1 shows an optical viewing system 10, wherein the optical device is a microscope 12 with an eyepiece 14.

The eyepiece 14 makes it possible to visually observe the optical image provided by the microscope 12 with one eye.

A beam splitter 22 is provided in the beam path 20 of the microscope 12 so that the image can also be captured with a camera 18 at the same time. The microscope 12 is a microscope with so-called infinity optics. This name is derived from the fact that a respective object 24 is projected to infinity by the microscope objective 26. This means that there is parallel light at the beam splitter 22. The beam splitter 22 reflects part of the light to the camera 18, while a different part of the light passes through the beam splitter 22 and through the eyepiece 14 to the viewing eye 16. This way the object 24 can simultaneously be visually observed through the eyepiece 14 and captured by the camera 18. To this end, the camera features a camera lens 28 and an image sensor 30. The camera lens 28 projects the image 32 of the object 24 on an image capturing level 34 of the image sensor 30.

For visual observation, the microscope 12 features a tube lens 36 that focuses the parallel beam path and generates a real intermediate image 40 of the object 24 on a field diaphragm 38 of the eyepiece 14. This can be viewed by the eye 16 through an eyepiece lens 42 of the eyepiece 14.

In the exemplary embodiment, the beam splitter 22 is a beam splitter cube with outer optical flats 44 and a semi-reflective mirror surface 46 that runs diagonally. Because of the optical density of the beam splitter cube, there are also partial reflections on the outer optical flats 44.

Figure 2:
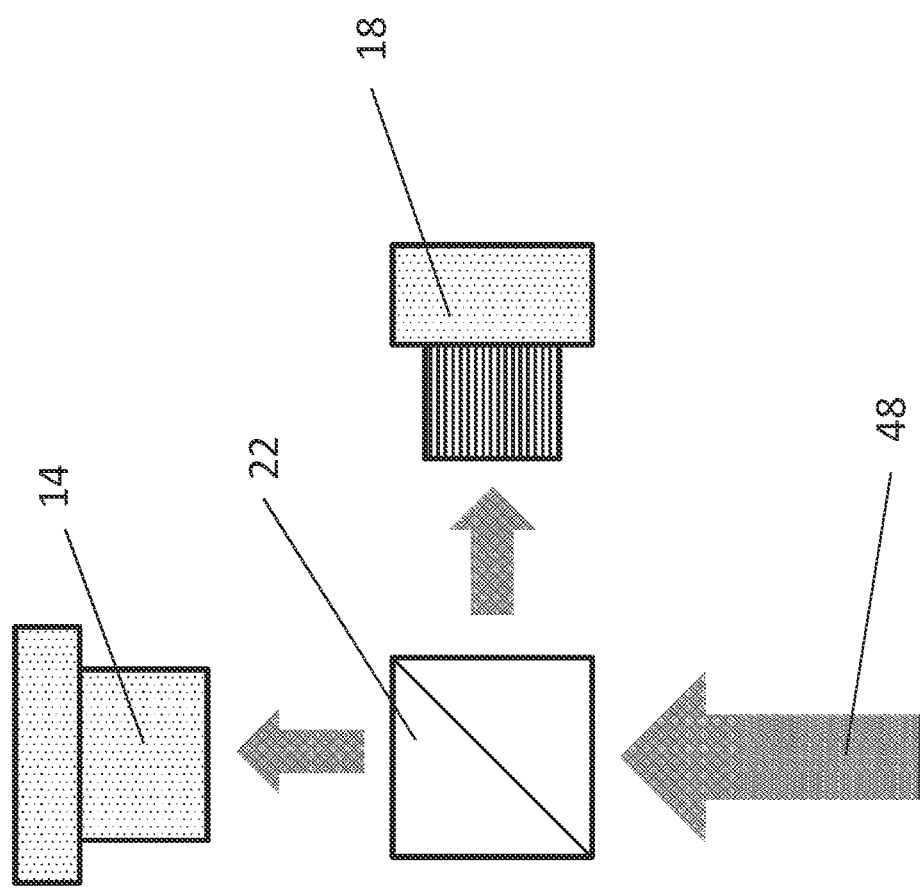
FIG. 2: schematically shows the customary application of a beam splitter on a microscope for reflecting an image outwardly to a camera.

FIG. 2 schematically shows the normal beam path through the viewing system 10 when viewing an object. Light passes through the lens of the optical device to the optical device; see reference number 48. It passes through the beam splitter 22; part of it passes through to the eyepiece 14 and part of it is (partially) reflected to the camera 18.

Often the eyepiece 14, the beam splitter 22, and the camera 18 with its lens 28 are not aligned in such a way that an image 32 of the object 24 captured by the image sensor 30 on its image capturing level 34 corresponds to the image seen by the eye 16 during visual observation through the eyepiece 14. One option to reduce, or avoid if possible, such deviations between the visually observed image and the image 32 captured by the camera 18 is to precisely position and align the camera 18 and the eyepiece 14. However, this is time-consuming and requires experience and skill.

The invention therefore proposes to create an image mask 50 for the image 32 of the object 24 captured by the image sensor 30, or to adjust it in such a way that the image 32 of the object 24 appears in the image mask 50 just like the visually observed image of the object 24.

To this end, the beam path through the eyepiece 14 and the beam splitter 22 is inverted by illuminating the eyepiece 14 on its side that is facing away from the optical device 12 and letting the light pass through the eyepiece 14 to the beam splitter 22. For this purpose, a light source 52 is provided that radiates into the eyepiece 14; see reference number 54. It is also possible to have daylight instead of a dedicated light source 52 illuminate the eyepiece 14.

An image processing device 82 connected to the camera 18, or that makes up a camera system 80 together with the camera 18, initially processes the image with the light spot 32', which is an image of the field diaphragm 38 of the eyepiece 14, captured by the image sensor 30 with inverted beam path (illumination through the eyepiece 14), to define an image mask 50. The image mask 50 thus obtained is later applied in the processing of images of an object 24 in order to display these images on a monitor 84 or display 84 in the same way the object is also seen by someone observing it through the eyepiece 14.

Figure 3:
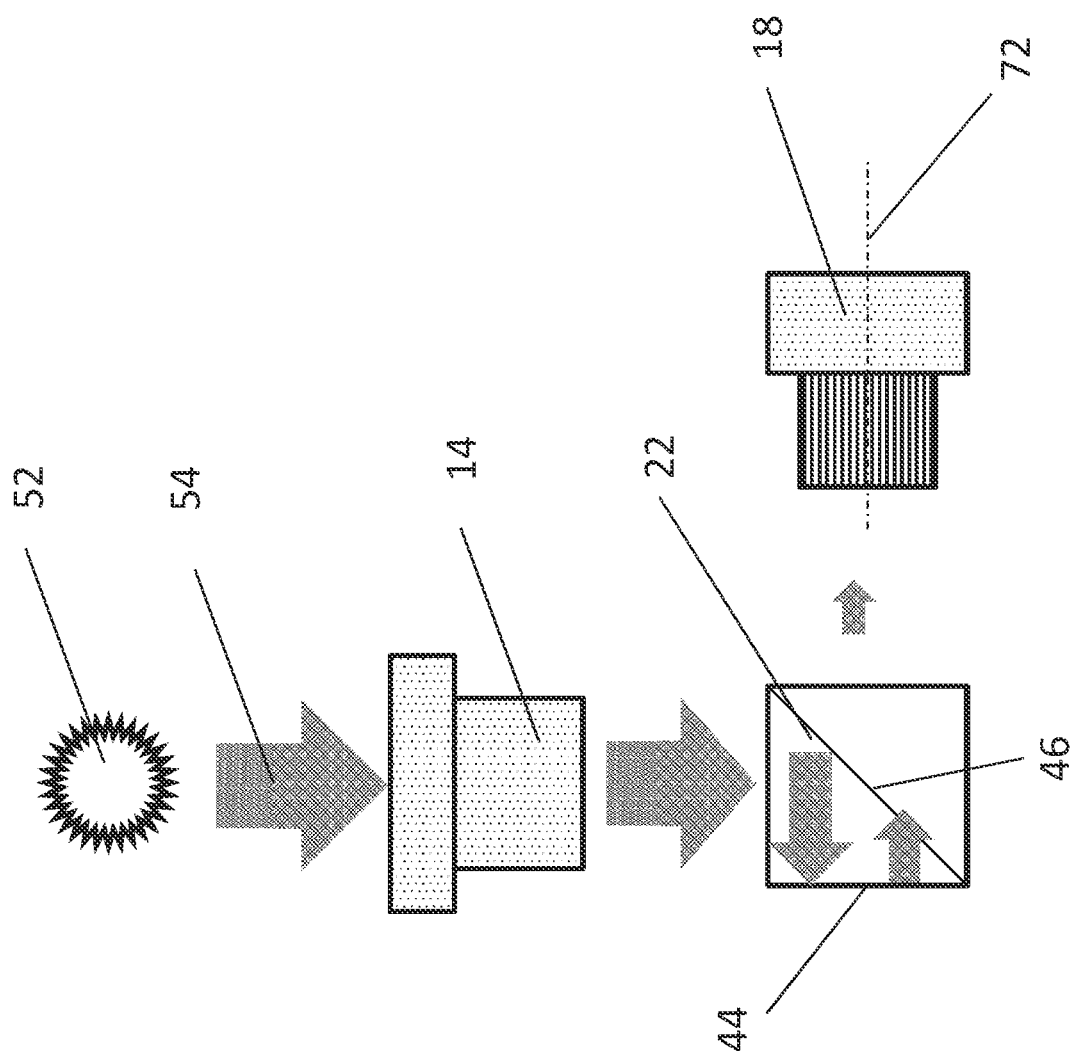
FIG. 3: shows the inverted use of the beam path according to the invention.

FIG. 3 shows the inverted use of the beam path according to the invention. The illumination of the object is switched off. Instead, the eyepiece 14 and the field diaphragm 38 located therein are illuminated. The light passes through the eyepiece 14 and falls onto the beam splitter 22 with its semi-reflective mirror surface 46. The light entering through the eyepiece is partially reflected from this semi-reflective surface to the optical flat 44 of the beam splitter 22 that is facing away from the camera 18. A back reflection occurs at the optical flat 44 of the beam splitter 22 that is facing away from the camera 18. This back reflection passes through the optical flat 44 of the beam splitter 22 that is facing away from the camera 18, and falls onto the camera 18. The light passing through the semi-reflective mirror surface 46 is back reflected by the optical flat 44 of the beam splitter 22 that is facing away from the eyepiece 14 to the semi-reflective mirror surface 46, which also partially reflects it to the camera 18. The camera 18 records the field diaphragm of the eyepiece 14—namely its light transmission opening that defines the field of view 56—on the image capturing level 34 of the image sensor 30.

Figure 4:
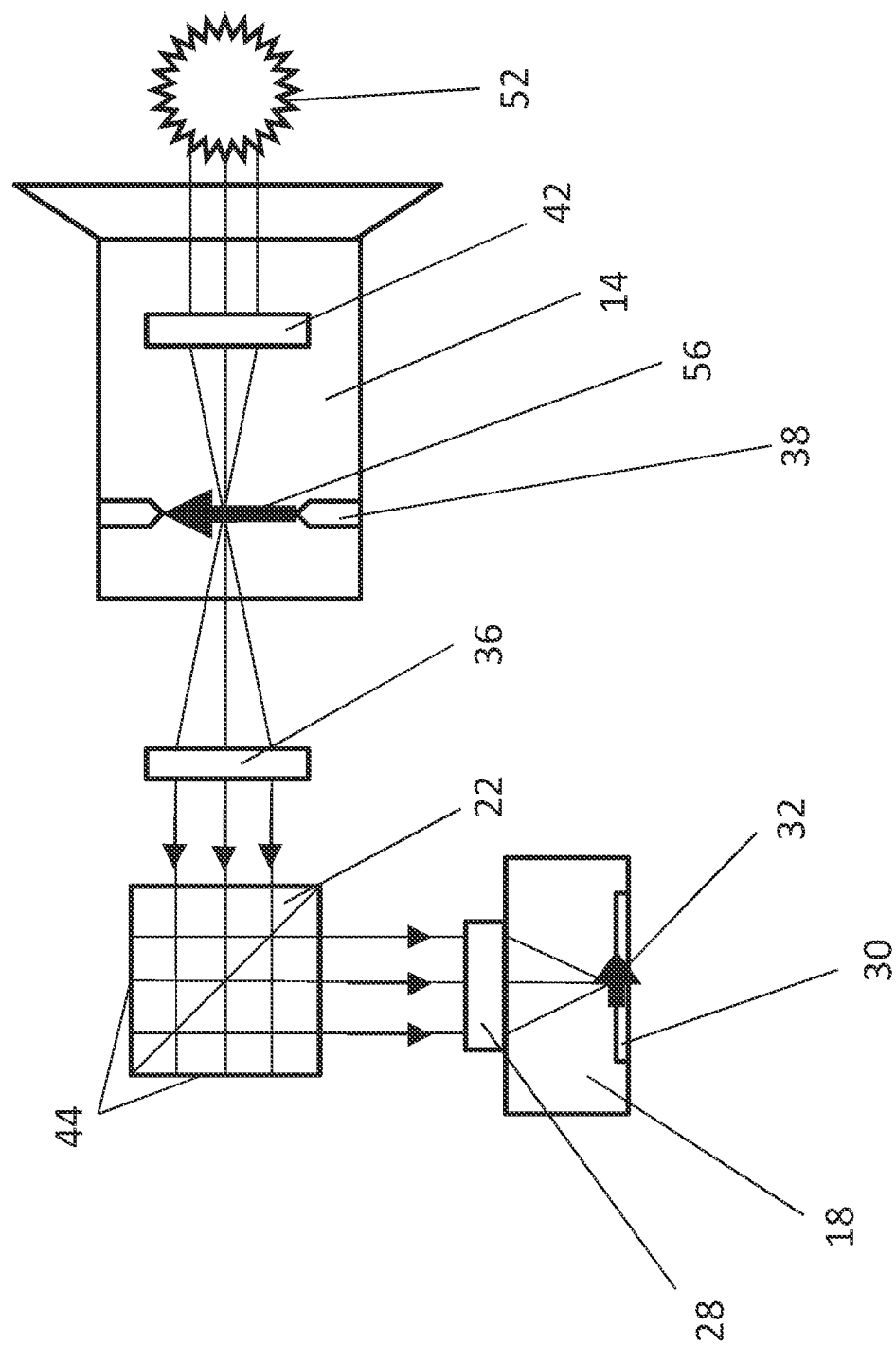
FIG. 4: shows the beam path of a microscope with so-called infinity optics.

FIG. 4 shows the inverted use according to the invention of such a microscope with beam splitter. In this case, the eyepiece 14 is illuminated. The field diaphragm 38 located in the eyepiece serves as the object. The two marked optical flats 44 of the beam splitter cube 22 cause a partial reflection because of the difference in the refraction index of air and glass. The invention uses this partial, normally undesirable reflection. It produces an image of the field of view 56 of the eyepiece 14 on the image sensor 30 of the camera 18, thus making the size and position of the field of view 56 of the eyepiece measurable with the camera.

Figure 5:
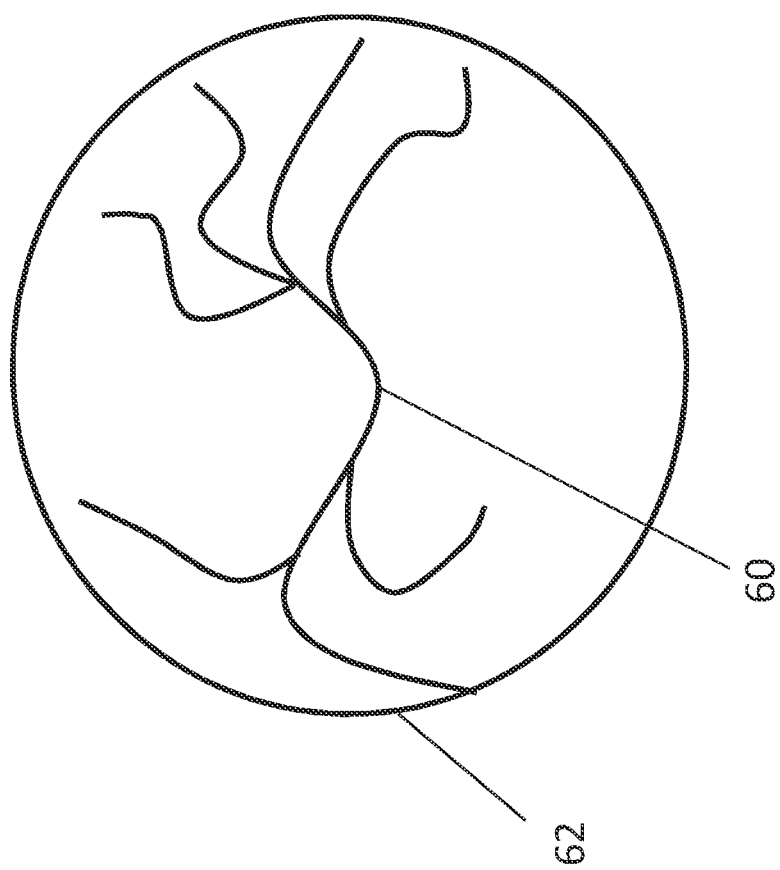
FIG. 5: shows an example of an eyepiece view of a biological object in a microscope during visual observation.

FIG. 5 shows an example of an eyepiece view of a biological object 60 under a microscope during visual observation. The field of view is restricted by the circular field of view edge 62 of the eyepiece.

Figure 6:
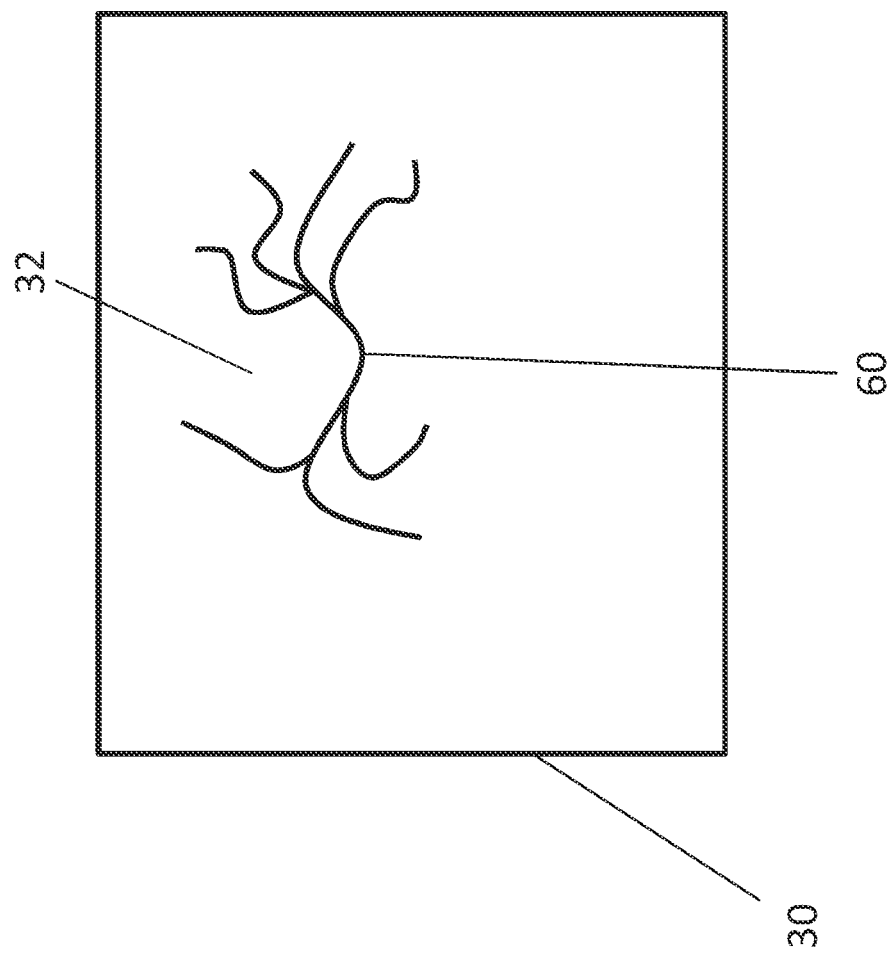
FIG. 6: shows the camera image associated with the eyepiece view in FIG. 5.

FIG. 6 shows the corresponding camera image 32 of the object 60. The image sensor 30 is rectangular, and the center of the image and field expansion do not correspond to the view through the eyepiece.

Figure 7:
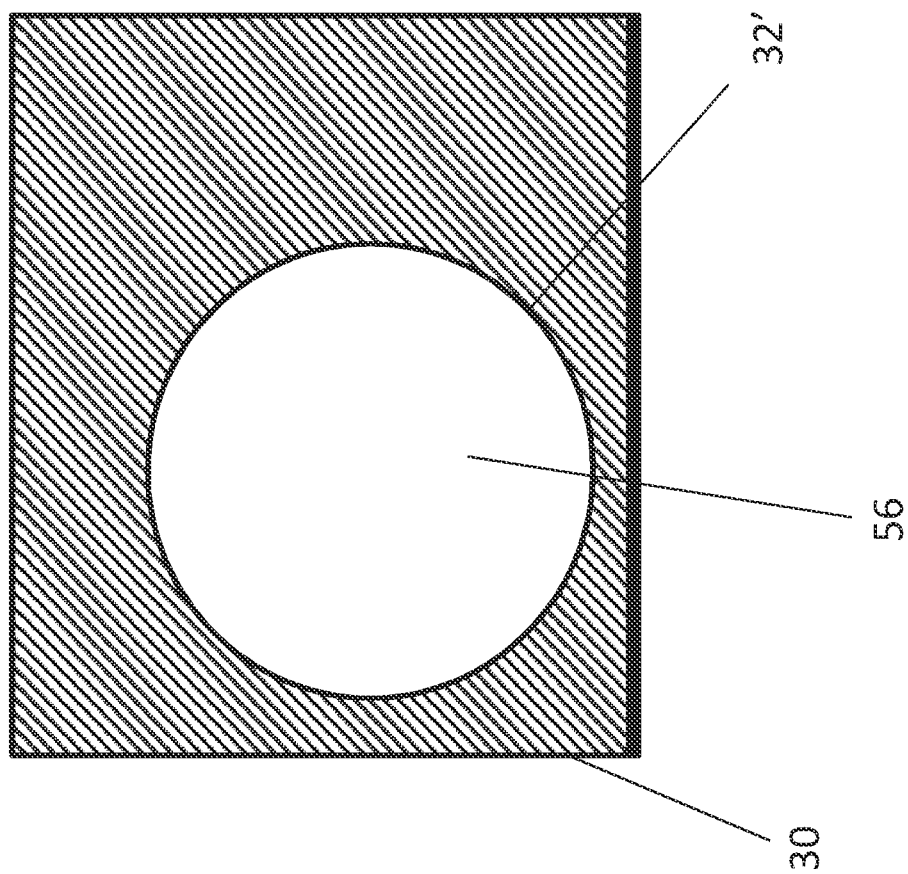
FIG. 7: shows the image of the field diaphragm through the camera according to the invention.

FIG. 7 shows the image 32 of the field diaphragm 38 or the field of view 56 through the camera 18 according to the invention; this image is produced when using the inverted beam path described with reference to FIGS. 3 and 4. The image 32 of the field of view 56 of the eyepiece 14 is identifiable as a brightly illuminated circle with a circle edge 32'.

Figure 8:
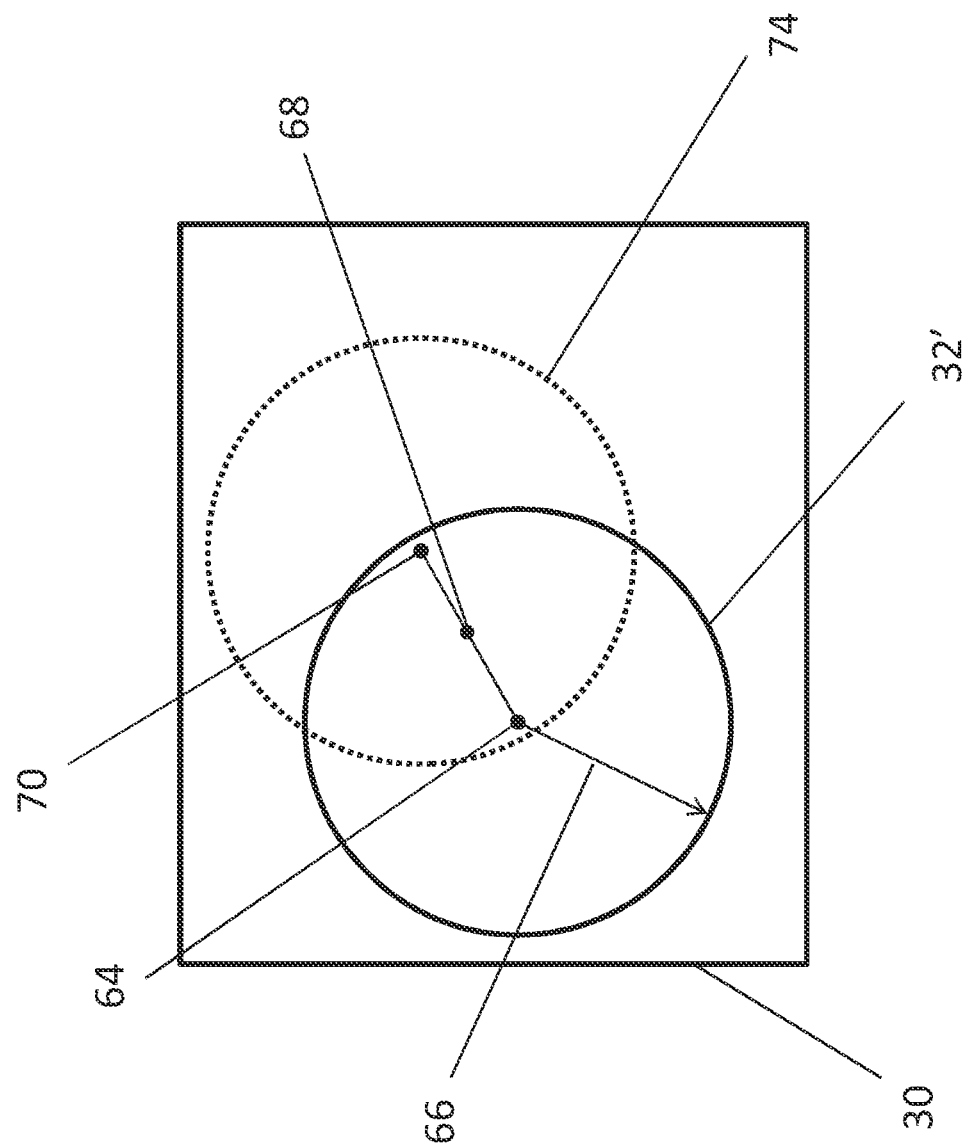
FIG. 8: shows how the position of the electronic image mask is determined.

FIG. 8 shows how the position of the electronic image mask 50 is determined. The center point 64 and the radius 66 of image 32' of the circular field of view 56 are determined by way of image recognition, for example. The center point 70 of the electronic image mask 50 is determined by way of point reflection at a main point 68. The main point 64 is defined by the intersection point of the optical axis 72 of the camera lens 28 with the image level 34 of the camera 18. This point reflection is necessary because the field of view is captured as a mirrored recording by the camera 18 in the illustrated example. The reference number 74 refers to the edge of the image mask 50. Alternatively, the back reflection can be aligned by a retroreflector arranged in the vicinity of the beam splitter such that a point reflection is not necessary.

Figure 9:
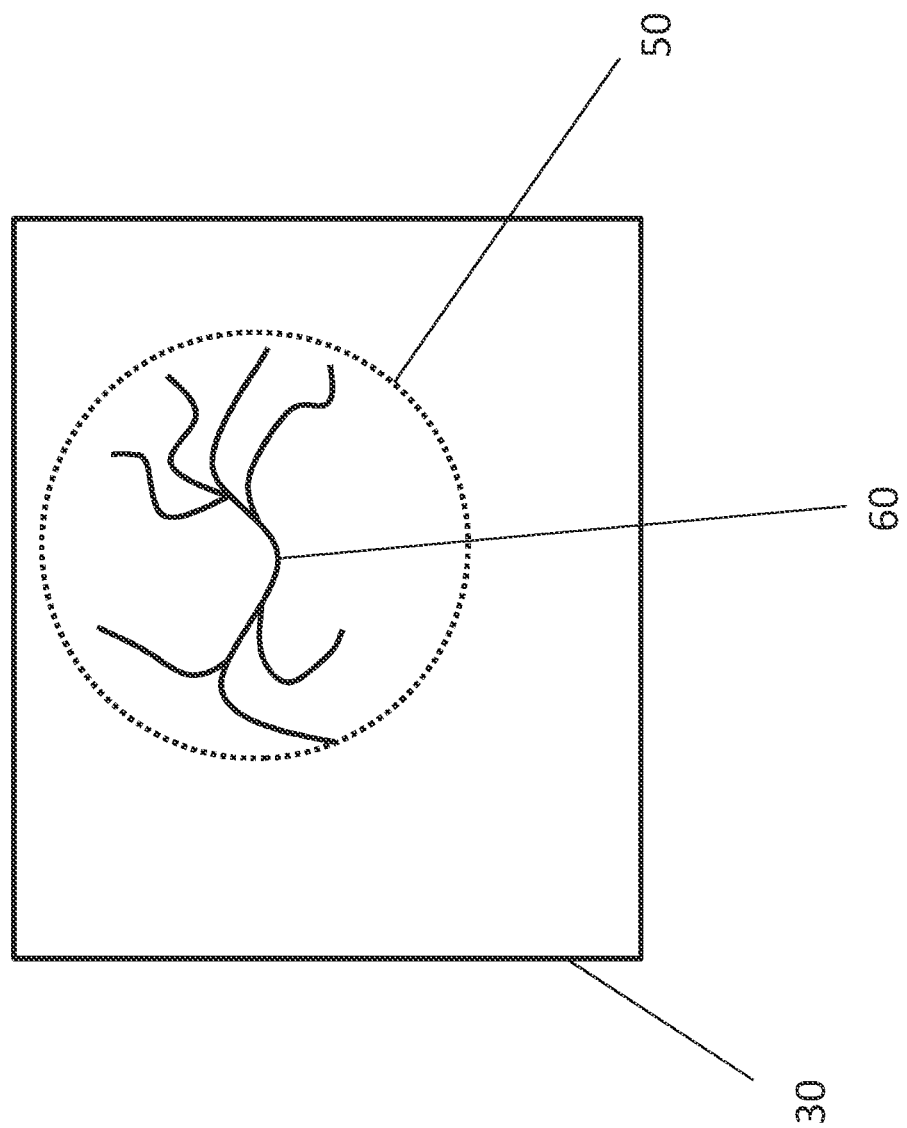
FIG. 9: shows how the masked sensor image is read within the image mask determined in the previous step.

FIG. 9 shows how the masked sensor image is read (only) within the image mask 50 determined in the previous step.

Figure 10:
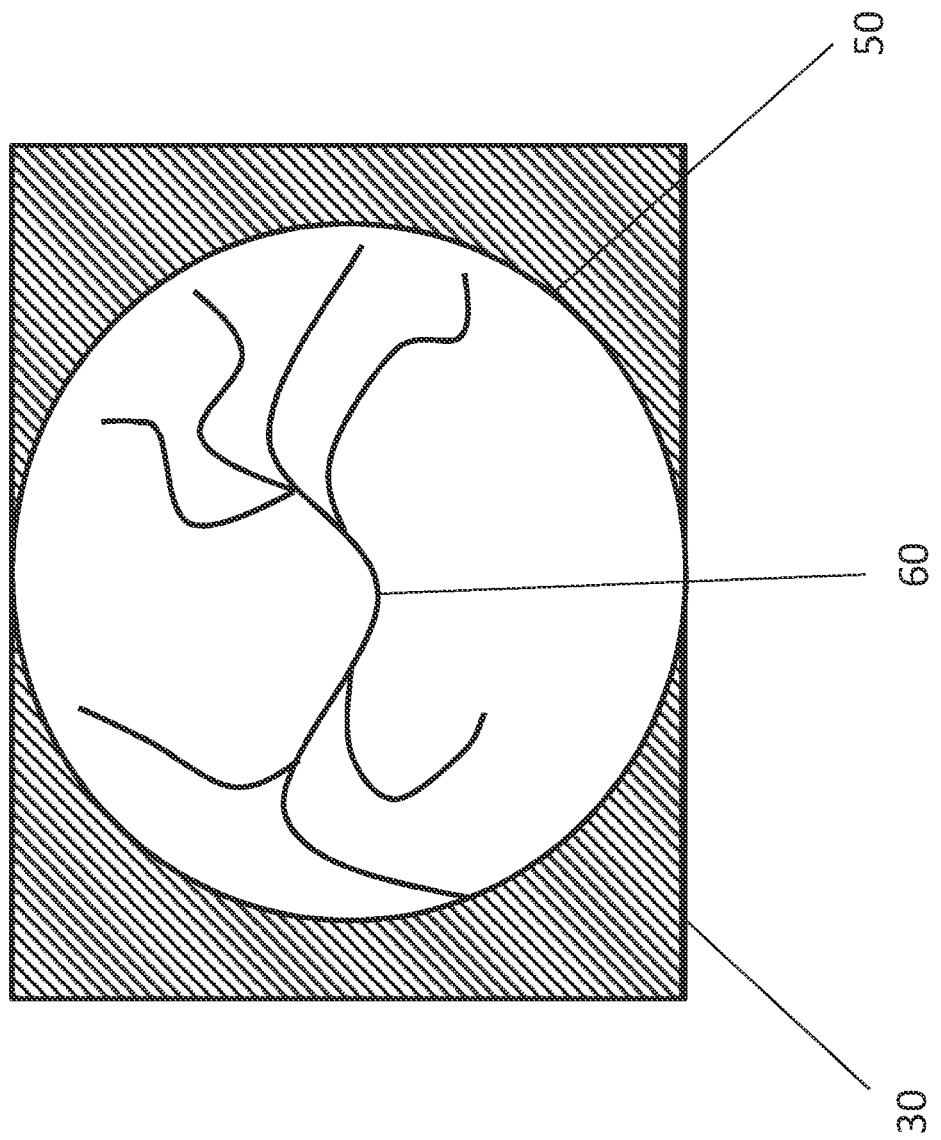
FIG. 10: shows the resulting screen display.

FIG. 10 shows the resulting screen display. Using electronics or software, the sensor image was masked and scaled based on the position and size of the field of view of the eyepiece determined in the previous steps. There is thus conformity between the image circle and the eyepiece view. Alternatively, the section can also be scaled to a greater or lesser degree. For example, the screen format can be filled completely, whereby the center of the image would correspond to the center of the eyepiece image.

FIG. 11 shows the method according to the invention in the form of a flow diagram.

To generate and/or adjust the image mask 50, the eyepiece 14 is illuminated from its side facing away from the optical device 12, and light passes through the eyepiece 14 to the beam splitter 22, so that the light from the first semi-reflective surface 46 is partially reflected to the second semi-reflective surface 44 and from the second semi-reflective surface 44 to the camera 18, resulting in the camera capturing an image of the field diaphragm 38 of the eyepiece 14 as a light spot 32' on the image capturing level 34 (110). The position of the center point 64 of the light spot 32' on the image capturing level 34 is determined (120), and the image mask 50 is then aligned on the image capturing level 34 based on the position of the center point 64 of the light spot 32'.

Aligning the image mask 50 based on the position of the center point 64 of the light spot on the image capturing level 34 comprises a point reflection (130) of the position of the center point 64 of the light spot 32' at the main point 68 where the (optical) main axis 72 of the camera lens 28 reaches the image capturing level 30.

In addition, in order to align the image mask 50, the radius 66 or diameter of the light spot 32' on the image capturing level 34 is measured (140), and a radius or diameter of the image mask 50 is adjusted, taking into consideration the radius 66 or the diameter of the light spot 32' on the image capturing level 34 (150).

After the image mask 50 has been determined in this manner, the part of the image 32 defined by the image mask 50 on the image sensor 30 is masked and scaled (160) based on the position and size of the image 32' of the field of view of the eyepiece determined in the previous steps, and respectively displayed on a monitor 84 (170), for example.

LIST OF REFERENCE NUMBERS 10 viewing system
12 microscope
14 eyepiece
16 eye
18 camera
20 beam path
22 beam splitter
24 object
26 microscope objective
28 camera lens
30 image sensor
32 image of the object
34 image capturing level
36 tube lens
38 field diaphragm
40 intermediate image
42 eyepiece lens
44 optical flat
46 semi-reflective mirror surface
48 normal light input
50 image mask
52 light source
54 inverted light input
56 field of view
60 object
62 edge of the field of view
64 center point of the image of the circular field of view
66 radius of the image of the circular field of view
68 main point
70 center point of the electronic image mask
72 optical axis of the camera lens
74 edge of the image mask
80 camera system
82 image processing device
84 monitor/display

The invention claimed is:

1. A method of aligning an eyepiece image and a camera image of a camera that is part of an optical viewing system, comprising:
   providing:
      an optical device,
      an eyepiece featuring a field diaphragm for direct visual observation with one eye,
      a beam splitter, and
      the camera that has an image capturing level,
      wherein the beam splitter, the eyepiece and the camera are arranged in such a way that an optical image provided by the optical device can be visually observed through the eyepiece with one eye and captured by the camera, and
      wherein the beam splitter features two semi-reflective surfaces, of which a first semi-reflective surface extends along a plane whose surface normal runs at a 45° angle to a main axis of the camera, and the second semi-reflective surface extends along a plane whose surface normal runs at a 90° angle to the main axis of the camera;
   adjusting an image mask for a camera image of the camera by:
      illumination the eyepiece from its side facing away from the optical device, wherein light passes through the eyepiece to the beam splitter so that the light is partially reflected by the first semi-reflective surface to the second semi-reflective surface and by the second semi-reflective surface to the camera, resulting in the camera capturing an image of the field diaphragm of the eyepiece as a light spot on the image capturing level;
      determining a position of a center point of the light spot on the image capturing level; and
      aligning the image mask based on the position of the center point of the light spot on the image capturing level.

2. The method according to claim 1, wherein the alignment of the image mask based on the position of the center point of the light spot on the image capturing level comprises a point reflection of the position of the center point of the light spot at a point where the main axis of the camera reaches the image capturing level.

3. The method according to claim 1, wherein, for adjusting the image mask, a diameter of the light spot on the image capturing level is determined and a diameter of the image mask is adjusted based on the diameter of the light spot on the image capturing level.

4. The method according to claim 1, wherein a beam splitter cube is used as the beam splitter, and the second semi-reflective surface is an outer surface of the beam splitter cube.

5. An optical viewing system, comprising:
   an optical device with an eyepiece, a beam splitter, a camera, and an image processing device,
   wherein the beam splitter, the eyepiece and the camera are arranged in such a way that an optical image provided by the optical device can be visually observed simultaneously through the eyepiece with one eye and captured by the camera; and
   wherein the beam splitter has at least two semi-reflective surfaces, of which a first semi-reflective surface extends along a plane whose surface normal runs at a 45° angle to a main axis of the camera, and the second semi-reflective surface extends along a plane whose surface normal runs at a 90° angle to the main axis of the camera;
   wherein the image processing device is configured to:
      recognize an image of a field diaphragm of the eyepiece captured by an image sensor of the camera as a light spot on an image capturing level of the camera;
      determine a position of a center point of the light spot on the image capturing level; and
      determine a center point for an image mask based on the position of the center point of the light spot on the image capturing level.

6. The optical viewing system according to claim 5, wherein the image processing device is configured to:
   determine a radius or a diameter of the light spot on the image capturing level; and
   determine a radius or a diameter for the image mask based on the radius or the diameter of the light spot on the image capturing level.

7. The optical viewing system according to claim 5, wherein the image processing device is configured to:
   mask and scale a part of the image on the image sensor that is defined by the image mask, based on a position and a size of the image mask; and generate a corresponding output image signal for a monitor or a display.

* * * * *